(12) United States Patent
Nakazato et al.

(10) Patent No.: US 9,046,017 B2
(45) Date of Patent: Jun. 2, 2015

(54) REGENERATION CONTROL DEVICE AND REGENERATION CONTROL METHOD OF DIESEL PARTICULATE FILTER

(75) Inventors: Tatsuro Nakazato, Hiratsuka (JP); Shuhei Kawaoka, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/816,945

(22) PCT Filed: Apr. 16, 2012

(86) PCT No.: PCT/JP2012/060269
§ 371 (c)(1),
(2), (4) Date: Feb. 14, 2013

(87) PCT Pub. No.: WO2013/005464
PCT Pub. Date: Jan. 10, 2013

(65) Prior Publication Data
US 2014/0116247 A1 May 1, 2014

(30) Foreign Application Priority Data

Jul. 4, 2011 (JP) .................................. 2011-148061

(51) Int. Cl.
*F01N 3/00* (2006.01)
*B01D 46/46* (2006.01)
(Continued)

(52) U.S. Cl.
CPC ............ *F01N 3/023* (2013.01); *F02D 41/0245* (2013.01); *F02D 41/029* (2013.01); *F02D 2041/0265* (2013.01); *F02D 2200/0812* (2013.01); *Y02T 10/26* (2013.01); *F01N 3/0253* (2013.01); *F01N 9/002* (2013.01); *F01N 2900/08* (2013.01); *F01N 2900/1411* (2013.01);
(Continued)

(58) Field of Classification Search
CPC .. B01D 46/0068; B01D 46/446; F02D 41/029; Y02T 10/47; F01N 3/002; F01N 3/023
USPC .................................................. 95/20; 60/285
See application file for complete search history.

(56) References Cited

U.S. PATENT DOCUMENTS 8,250,858 B2 * 8/2012 Kamiya et al. .................. 60/295
2008/0087011 A1 * 4/2008 Konstandopoulos ........... 60/311
(Continued)

FOREIGN PATENT DOCUMENTS

CN 101091038 A 12/2007
CN 101466925 A 6/2009
(Continued)

OTHER PUBLICATIONS

International Search Report dated Jul. 17, 2012, issued for PCT/JP2012/060269.

*Primary Examiner* — Amber Orlando
(74) *Attorney, Agent, or Firm* — Locke Lord LLP

(57) ABSTRACT

A regeneration control device of a diesel particulate filter, includes: a regeneration control unit configured to combust particulate matter accumulated in a diesel particulate filter that removes the particulate matter from exhaust gas of an engine and regenerate the diesel particulate filter when an accumulation amount of the particulate matter accumulated in the diesel particulate filter exceeds a predetermined value, wherein the regeneration control unit is configured to perform lower limit control in which a lower limit of an engine speed is set to a value greater than or equal to a predetermined threshold value during the regeneration.

10 Claims, 7 Drawing Sheets

(51) Int. Cl.
  *F01N 3/023* (2006.01)
  *F02D 41/02* (2006.01)
  *F01N 3/025* (2006.01)
  *F01N 9/00* (2006.01)

(52) U.S. Cl.
  CPC . *F01N 2900/1602* (2013.01); *F01N 2900/1606* (2013.01); *F02D 2200/0802* (2013.01); *F02D 2200/101* (2013.01); *Y02T 10/47* (2013.01)

(56) References Cited

U.S. PATENT DOCUMENTS

2008/0264045 A1   10/2008   Hara et al.
2010/0095656 A1*  4/2010   Kamiya et al. .................. 60/287
2010/0313551 A1   12/2010  Johnson et al.
2012/0227379 A1*  9/2012   Koestler .......................... 60/274
2012/0325093 A1* 12/2012   Shiomi et al. ................... 96/425

FOREIGN PATENT DOCUMENTS

| | | |
|---|---|---|
| JP | 2004-278405 A | 10/2004 |
| JP | 2005-201061 A | 7/2005 |
| JP | 2006-105057 A | 4/2006 |
| JP | 2006-250036 A | 9/2006 |
| JP | 4003768 B2 | 11/2007 |
| JP | 2009-540213 A | 11/2009 |
| WO | WO-2007145553 A1 | 12/2007 |

* cited by examiner

REGENERATION CONTROL DEVICE AND REGENERATION CONTROL METHOD OF DIESEL PARTICULATE FILTER

FIELD

The present invention relates to a regeneration control device and a regeneration control method of a Diesel Particulate Filter (referred to as a DPF) for removing particulate matter (PM) contained in exhaust gas of an engine when performing a regeneration treatment of a DPF.

BACKGROUND

To decrease PM contained in exhaust gas, a diesel engine (hereinafter, engine) is provided with a DPF in an exhaust pipe line. The DPF collects PM such as soot contained in exhaust gas, and discharges exhaust gas in which PM is decreased to air. When PM collected in the DPF increases, a filter performance is degraded, and thus a regeneration that combusts the collected PM is performed in the DPF. The regeneration includes a natural regeneration in which PM accumulated when a temperature of exhaust gas is high naturally combusts, and a forced regeneration performed when an amount of PM accumulation exceeds a predetermined reference value. In the forced regeneration, an operating condition of an engine is adjusted to raise a temperature of exhaust gas, and PM is forcibly combusted by performing an external dozing that injects fuel at a previous stage of the DPF, or an internal dozing that injects fuel to the inside of a cylinder of the engine. Further, the forced regeneration includes an automatic forced regeneration and a manual forced regeneration. When the amount of PM accumulation further increases to exceed a reference value used when the automatic forced regeneration is performed, and the DPF is likely to be blocked, a warning that urges a manual performance of a forced regeneration is given to an operator.

Herein, Patent Literature 1 describes that an exhaust gas amount adjustment unit is included to reduce a rate of decrease of an amount of exhaust gas flowing in the DPF when a DPF temperature is raised by decreasing an amount of incoming air during the automatic forced regeneration, and the DPF is prevented from being overheated.

CITATION LIST

Patent Literature

Patent Literature 1: Japanese Patent Application Laid-open No. 2004-278405

SUMMARY

Technical Problem

In a working vehicle such as a construction machine that operates using an engine as a power source, a DPF is provided to purify exhaust gas. An operator that operates the vehicle may arbitrarily perform control (for example, a run operation) of the vehicle or an operation of an operating machine during the automatic forced regeneration described above. For this reason, when the automatic forced regeneration is initiated and continued in a state in which control of the vehicle or an operation of the operating machine is not performed by the operator, or a state in which control of the vehicle or an operation of the operating machine by the operator is not performed continues even after the automatic forced regeneration is ended, a state in which an engine speed is low (for example, an idling state of an engine) is continued, and thus a flow rate of exhaust gas decreases. When a flow rate of exhaust gas decreases, high-temperature exhaust gas stays in the DPF, and heat is confined so that a DPF temperature rapidly increases. As a result, a portion of the DPF may be damaged due to heat stress, and a filter performance may be degraded.

Patent Literature 1 discloses a technology for reducing a rate of decrease of an amount of exhaust gas flowing in the DPF by reducing a valve shutting speed of an intake throttle valve when an operating condition of decreasing an amount of incoming air of an engine is satisfied during the automatic forced regeneration.

The invention is conceived in view of the above description, and an object of the invention is to provide a regeneration control device and a regeneration control method of a DPF capable of preventing a degradation of a filter performance of the DPF.

Solution to Problem

To achieve the object mentioned above, according to the present invention, a regeneration control device of a diesel particulate filter, comprises: a regeneration control unit configured to combust particulate matter accumulated in a diesel particulate filter that removes the particulate matter from exhaust gas of an engine and regenerate the diesel particulate filter when an accumulation amount of the particulate matter accumulated in the diesel particulate filter exceeds a predetermined value, wherein the regeneration control unit is configured to perform lower limit control in which a lower limit of an engine speed is set to a value greater than or equal to a predetermined threshold value during the regeneration.

According to the present invention, the regeneration control unit is configured to continue to perform the lower limit control in which the lower limit of the engine speed is set to the value greater than or equal to the predetermined threshold value for a predetermined time after the regeneration is ended.

According to the present invention, the regeneration control unit is configured to initiate the lower limit control in which the lower limit of the engine speed is set to the value greater than or equal to the predetermined threshold value when a predetermined control initiation condition is satisfied during the regeneration.

According to the present invention, the predetermined control initiation condition is that a state in which the engine speed is greater than or equal to the predetermined threshold value lasts a predetermined time or more.

According to the present invention, the regeneration control device of the diesel particulate filter further comprises: an environmental condition detecting unit configured to detect an environmental temperature or an altitude around the engine, wherein the predetermined threshold value and the predetermined time varies in response to the environmental temperature or the altitude detected by the environmental condition detecting unit.

According to the present invention, the predetermined control initiation condition is that a temperature inside the diesel particulate filter is greater than or equal to a predetermined temperature.

According to the present invention, the predetermined control initiation condition is that a flow rate of the exhaust gas is less than or equal to a predetermined flow rate.

According to the present invention, the regeneration control device of the diesel particulate filter, further comprising: a setting unit configured to give a setting instruction to perform the lower limit control, wherein the regeneration control unit is configured to perform the lower limit control when the setting instruction of the lower limit control is given by the setting unit.

According to the present invention, the regeneration control unit is configured not to perform an automatic regeneration process of the diesel particulate filter when the setting instruction of the lower limit control is not given by the setting unit.

According to the present invention, a regeneration control method of a diesel particulate filter, comprises: combusting particulate matter accumulated in a diesel particulate filter that removes the particulate matter from exhaust gas of an engine and regenerating the diesel particulate filter when an accumulation amount of the particulate matter accumulated in the diesel particulate filter exceeds a predetermined value, wherein the combusting and regenerating comprises performing lower limit control in which a lower limit of an engine speed is set to a value greater than or equal to a predetermined threshold value during the regeneration.

According to the present invention, the combusting and regenerating comprises continuously performing the lower limit control in which the lower limit of the engine speed is set to the value greater than or equal to the predetermined threshold value for a predetermined time after the regeneration is ended.

According to the present invention, the combusting and regenerating comprises initiating the lower limit control in which the lower limit of the engine speed is set to the value greater than or equal to the predetermined value when a predetermined control initiation condition is satisfied during the regeneration.

According to the invention, the regeneration control unit performs lower limit control in which a lower limit of an engine speed is set to a value greater than or equal to a predetermined threshold value during the automatic forced regeneration and after the automatic forced regeneration, and thus it is possible to increase a flow rate of exhaust gas to the DPF, prevent a damage of the DPF due to heat confined in the DPF, and prevent a degradation of a filter performance accordingly.

DESCRIPTION OF EMBODIMENTS

Hereinafter, Embodiments for implementing the invention will be described with reference to accompanying drawings.

First Embodiment (Schematic Configuration of Engine System)

Figure 1:
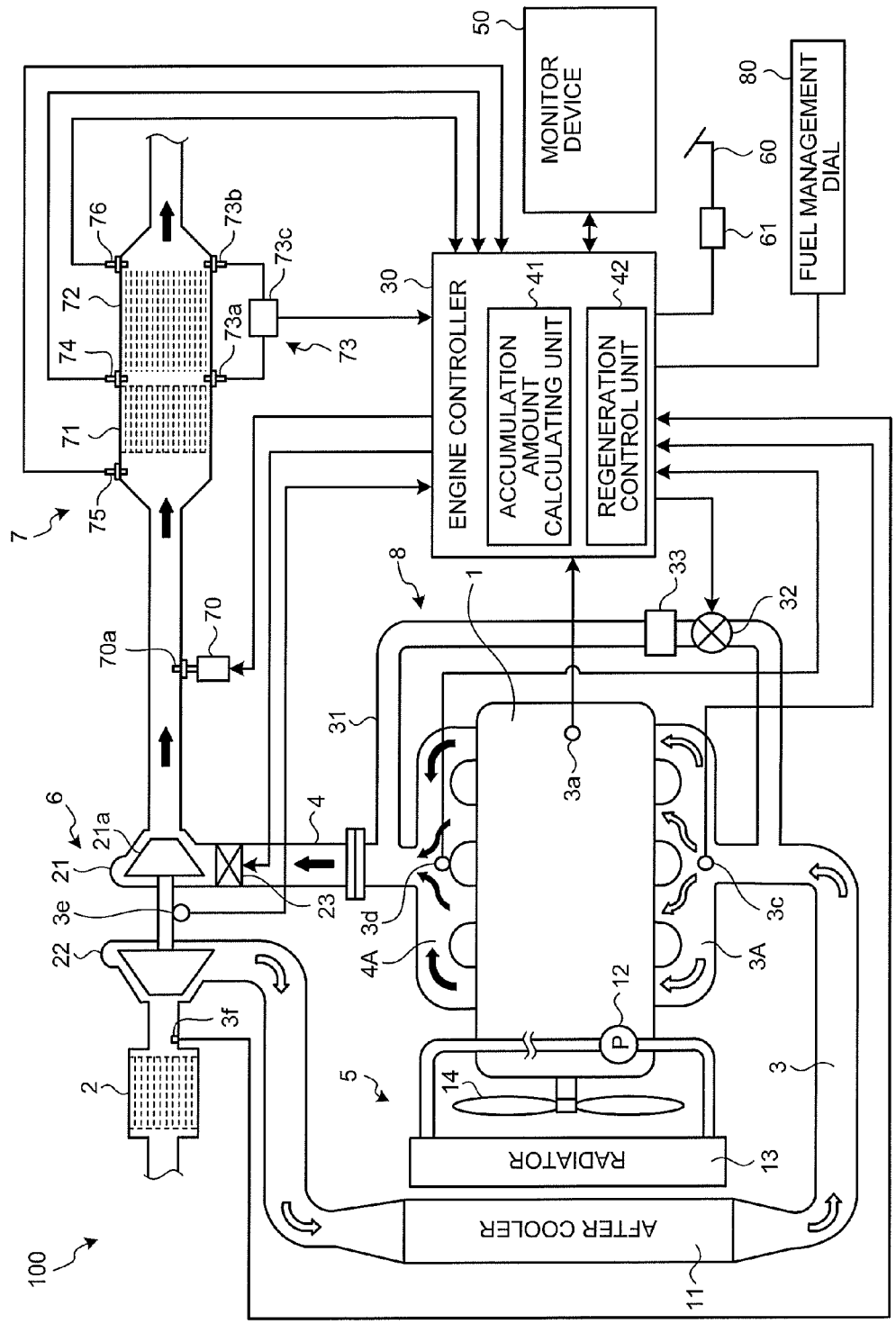
FIG. 1 is a schematic view illustrating a schematic configuration of a diesel engine 100 including a regeneration control device of a diesel particulate filter according to First Embodiment of the invention.

FIG. 1 is a schematic view illustrating a schematic configuration of a diesel engine 100 (hereinafter, engine 100 unless otherwise noted) including a reproduction control device of a diesel particulate filter (DPF) according to First Embodiment of the invention. In addition, it is assumed that the engine 100 is used as a power source of a construction machine including an excavator, a dump truck, and the like, or a working vehicle including an industrial vehicle such as a forklift. Referring to FIG. 1, the engine 100 includes an engine body 1 in which a plurality of combustion chambers is formed on an inside, an air cleaner 2 that filters absorbed air using a filter, and prevents foreign matter such as dust from being mixed into a combustion chamber, an air supply pipe line 3 that provides an air supply to each combustion chamber inside the engine body 1, an exhaust pipe line 4 that discharges exhaust gas discharged from each combustion chamber inside the engine body 1, a cooling mechanism 5, an exhaust gas turbine supercharger 6, an exhaust purification device 7, an exhaust gas recirculation system 8, an engine controller 30, a monitor device 50, a gas pedal 60, and a fuel management dial 80.

An air supply manifold 3A is attached between the engine body 1 and the air supply pipe line 3 so that an air supply from the air supply pipe line 3 is distributed to each combustion chamber inside the engine body 1. An exhaust manifold 4A is attached between the engine body 1 and the exhaust pipe line 4 so that exhaust gas exhausted from each combustion chamber inside the engine body 1 collectively flows in the exhaust pipe line 4.

The air supply pipe line 3 is provided with an after cooler 11 that cools down air compressed by the exhaust gas turbine supercharger 6. The cooling mechanism 5 includes a pump 12 that is driven by a rotational motion of a crankshaft (not illustrated) and the like put in the engine body 1. Cooling water pumped by the pump 12 cools down portions needed to be cooled down such as the engine body 1, the exhaust gas turbine supercharger 6, an oil cooler (not illustrated), and the like, and then is air-cooled by a radiator 13 provided in the cooling mechanism 5. The after cooler 11 and the radiator 13 have a configuration satisfying a cooling performance by a fan 14 that is provided to the engine body 1, and is rotationally driven by a rotational motion of the crankshaft (not illustrated) and the like.

The exhaust gas turbine supercharger 6 includes a turbine 21 provided in midstream of the exhaust pipe line 4, a compressor 22 that is provided in midstream of the air supply pipe line 3, and is driven by being connected to the turbine 21, and a variable turbo nozzle 23 used to control a flow velocity of exhaust gas supplied to the turbine 21. The exhaust gas turbine supercharger 6 controls an engine speed of a turbine wheel 21a by controlling opening of the variable turbo nozzle 23. The compressor 22 is driven by a rotation of the turbine 21 (turbine wheel 21a), and an air supply supercharge is performed on the engine body 1.

The exhaust purification device 7 is provided on a downstream side of the turbine 21, removes PM (particulate matter) contained in exhaust gas, and includes a DOC (Diesel Oxidation Catalyst) 71, a DPF 72, a differential pressure sensor 73, temperature sensors 74, 75, and 76. The DOC 71 and the DPF 72 are provided on an inside of a cylindrical exhaust pipe line. The DOC 71 is provided on an upstream side of the exhaust pipe line, and the DPF 72 is provided on a downstream side of the exhaust pipe line. In addition, a dozing nozzle 70a that injects a dozing fuel supplied from a dozing fuel feeder 70 is disposed between the turbine 21 and the exhaust purification device 7. A dozing fuel is injected during a forced regeneration.

The DOC 71 is implemented by Pt (platinum) and the like, and oxidizes and removes CO (carbon monoxide) and HC (carbon hydride) contained in exhaust gas, and SOF (Soluble Organic Fraction) contained in PM. Further, the DOC 71 oxidizes NO (nitrogen monoxide) contained in exhaust gas to change NO to NO2 (nitrogen dioxide), and raises the temperature of exhaust gas by oxidizing a dozing fuel injected from the dozing nozzle 70a.

The DPF 72 collects PM. The DPF 72 is implemented using silicon carbide and the like as a base material. PM contained in exhaust gas is collected when passing through a minute hole formed in the DPF 72. In the DPF 72, cells having a fine passage along a flow direction of exhaust gas are densely disposed inside the cylindrical exhaust pipe line. The DPF 72 is a wall flow type DPF in which a cell including a sealed edge on an upstream side and a cell including a sealed edge on a downstream side are alternately disposed. The collected PM is oxidized (combusted) by oxygen contained in exhaust gas and NO2 generated in the DOC 71 under a condition of a temperature at which the exhaust gas may proceed with an oxidation reaction.

The differential pressure sensor 73 includes a pressure sensor 73a that is disposed on an upstream side of the DPF 72, and detects a pressure of the upstream side of the DPF 72, a pressure sensor 73b that is disposed on a downstream side of the DPF 72, and detects a pressure of the downstream side of the DPF 72, and a differential pressure detector 73c that outputs a differential pressure obtained by subtracting a pressure detected by the pressure sensor 73b from a pressure detected by the pressure sensor 73a to the engine controller 30.

The temperature sensor 74 is disposed on an upstream side of the DPF 72 to detect an exhaust gas temperature of an entrance of the DPF 72, and output the exhaust gas temperature as a DPF temperature to the engine controller 30. In addition, the temperature sensor 75 is disposed on an upstream side of the DOC 71 to detect an exhaust gas temperature of an entrance of the DOC 71, and output the exhaust gas temperature to the engine controller 30. In addition, the temperature sensor 76 detects an exhaust gas temperature of an exit of the DPF 72, and outputs the exhaust gas temperature to the engine controller 30.

The exhaust gas recirculation system 8 includes an exhaust gas recirculation passage 31 that communicates with the exhaust manifold 4A and the air supply pipe line 3. The exhaust gas recirculation passage 31 extracts a portion of exhaust gas from the exhaust manifold 4A to recirculate the portion of exhaust gas to the air supply pipe line 3. The exhaust gas recirculation passage 31 is provided with an EGR valve 32 that opens and closes the exhaust gas recirculation passage 31, and an EGR cooler 33 that cools down exhaust gas from the exhaust manifold 4A. By circulating the portion of exhaust gas to the air supply manifold 3A through the exhaust gas recirculation passage 31, the exhaust gas recirculation system 8 decreases a concentration of oxygen in the air supply, and lowers a combustion temperature of the engine body 1. In this way, it is possible to reduce an amount of nitrogen oxide contained in exhaust gas.

Herein, the engine 100 includes, as a control system, an engine speed sensor 3a, a boost pressure sensor 3c, an exhaust gas pressure sensor 3d, a turbine rotation speed sensor 3e, and a flow rate sensor 3f. The engine speed sensor 3a detects a rotational speed of the crankshaft (not illustrated) of the engine body 1, and outputs a signal indicating the rotational speed of the crankshaft (not illustrated) to the engine controller 30.

The boost pressure sensor 3c detects a boost pressure between an outlet passage of the compressor 22 and the air supply manifold 3A, and outputs the boost pressure to the engine controller 30. The exhaust gas pressure sensor 3d detects an exhaust gas pressure between the exhaust manifold 4A and an entrance passage of the turbine 21, and inputs a signal indicating the exhaust gas pressure to the engine controller 30. The turbine rotation speed sensor 3e detects a rotational speed of the turbine 21, and outputs a signal indicating the rotational speed of the turbine 21 to the engine controller 30.

The engine controller 30 controls an engine speed or torque by adjusting an amount of fuel injection, a fuel injection timing, the EGR valve 32, and the variable turbo nozzle 23 in response to an input value of an input unit such as the gas pedal 60 and the fuel management dial 80 operated by an operator. A storage device (for example, memory such as ROM and RAM) of the engine controller 30 stores a control parameter (a duration TB, a predetermined time Tth, and a predetermined value Nth of an engine speed used to control a lower limit) to be described below.

In addition, the engine controller 30 includes an accumulation amount calculating unit 41 and a regeneration control unit 42. The accumulation amount calculating unit 41 estimates an amount of PM accumulation accumulated in the DPF 72 based on information about a flow rate of exhaust gas, information about an amount of PM generation, information about an amount of PM combustion, a differential pressure obtained from the differential pressure sensor 73, and a DPF temperature obtained from the temperature sensor 74.

When an estimated value of an amount of PM accumulation exceeds a predetermined threshold value, the regeneration control unit 42 raises an exhaust gas temperature by adjusting an amount of fuel injection, a fuel injection timing, the EGR valve 32, and the variable turbo nozzle 23, and then performs control of forcing the DPF 72 to be regenerated by injecting a dozing fuel from the dozing nozzle 70a. That is, the regeneration control unit 42 raises an exhaust gas temperature by squeezing each of the EGR valve 32 and the variable turbo nozzle 23 during the forced regeneration. In particular, in this embodiment, during an automatic forced regeneration, the regeneration control unit 42 performs lower limit control of setting an engine speed to a predetermined value or more so that heat of exhaust gas flowing in the DPF 72 is not confined in the DPF 72. The regeneration control unit 42 receives a manual forced regeneration instruction from the monitor device 50, and performs a manual forced regeneration. An automatic forced regeneration is performed when an amount of PM accumulation is greater than or equal to a first threshold value, and a manual forced regeneration is performed when an amount of PM accumulation is greater than or equal to a second threshold value which is greater than the first threshold value. During the automatic forced regeneration, an operator of a working vehicle may perform a normal driving or operation. During the manual forced regeneration, a working vehicle is stopped to only perform a forced regeneration.

The monitor device 50 is connected to the engine controller 30, and is provided near a driving seat of a working vehicle. The monitor device 50 is constructed using a liquid crystal display and the like. When an amount of PM accumulation exceeds the second threshold value, the engine controller 30 notifies a manual forced regeneration instruction to the monitor device 50, and the monitor device 50 displays a warning that urges a manual forced regeneration. The engine controller 30 performs manual forced regeneration processing when a manual forced regeneration instruction button (not illustrated) provided in the monitor device 50 is pressed by an operator or a service man of a working vehicle.

(Lower Limit Control of Engine Speed)

Figure 2:
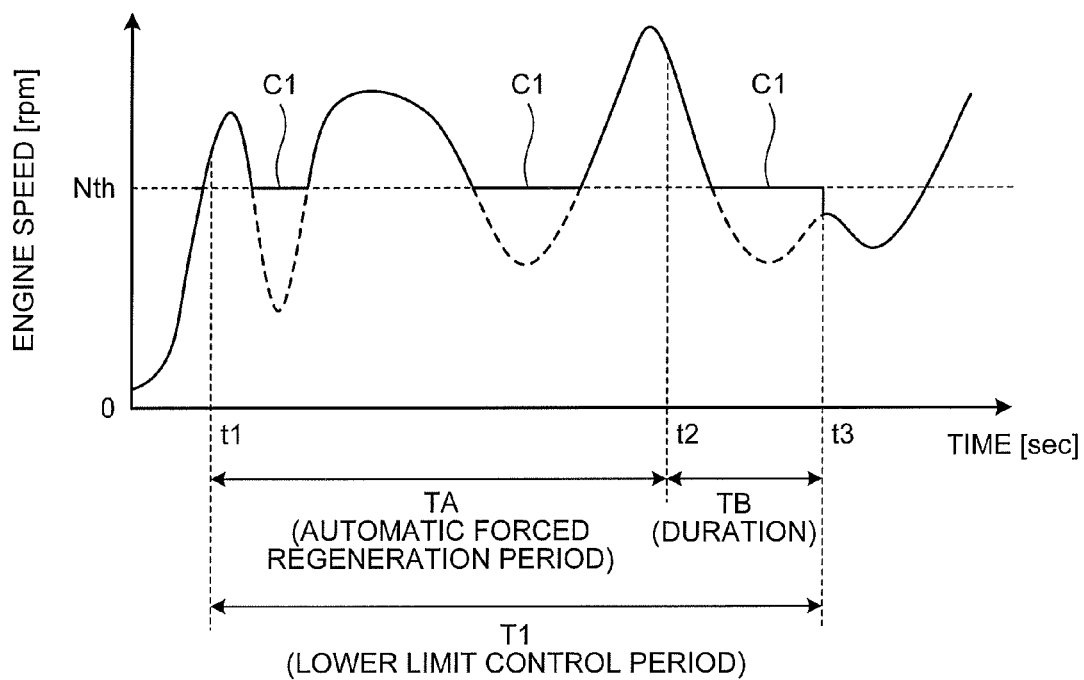
FIG. 2 is a timing chart illustrating lower limit control by a regeneration control unit illustrated in FIG. 1.

Herein, an outline of lower limit control of an engine speed during an automatic forced regeneration by the regeneration control unit 42 will be described with reference to FIG. 2. FIG. 2 illustrates a passage of time on a horizontal axis, and a change of an engine speed on a vertical axis. Referring to FIG. 2, a point in time t1 denotes a starting point of an automatic forced regeneration. In addition, a point in time t2 denotes an ending point of an automatic forced regeneration. In addition, a point in time t3 denotes an ending point of a duration which continues lower limit control from the point in time t2. Thus, automatic forced regeneration processing is performed from the point in time t1 to the point in time t2 (an automatic forced regeneration period TA). Herein, as described in the foregoing, during an automatic forced regeneration, it is possible to arbitrarily perform a driving of a working vehicle or an operation of an operating machine (for example, an operation of an operating machine (boom, arm, and bucket) provided to be used for an excavation operation when a working vehicle is an excavator) regardless of the automatic forced regeneration. In response to the driving of the working vehicle or the operation of the operating machine, an engine speed varies from hour to hour. The working vehicle is provided with the gas pedal 60 used to adjust a running speed and an operating lever used to activate the operating machine inside an operating room. When an operator operates the gas pedal 60 or the operating lever, the engine controller 30 controls an engine speed in response to the operation. That is, when an operator operates an operating lever to perform an excavation using an operating machine, an engine speed increases accordingly. When the operator stops the operation, the engine speed decreases to a predetermined idling engine speed. As a solid line (excluding portions of C1) and a broken line of a waveform illustrated in FIG. 2, the engine speed varies up and down. However, when lower limit control of the engine speed is performed during an automatic forced regeneration, and the operator operates the operating lever, the engine speed increases accordingly. However, when the operator does not perform any operation, the engine speed does not decrease as the broken line illustrated in FIG. 2, and does not decrease to be less than or equal to an engine speed Nth. That is, the engine speed varies along the solid line (including portions of C1) illustrated in FIG. 2. As described in the foregoing, a period of the lower limit control is a lower limit control period T1 from the point in time t1 to the point in time t3 including a duration TB.

Incidentally, to raise a DPF temperature during an automatic forced regeneration, at least the variable turbo nozzle 23 is squeezed. However, in this instance, when a flow rate of exhaust gas flowing in the DPF 72 is small, heat is confined in the DPF 72. In First Embodiment, even when the variable turbo nozzle 23 is squeezed during an automatic forced regeneration, it is controlled such that a lower limit of the engine speed is greater than or equal to the predetermined value Nth, and exhaust gas of which a flow rate is greater than or equal to a predetermined flow rate is provided to and passed through the DPF 72, thereby preventing heat from being confined in the DPF 72. That is, in the automatic forced regeneration period TA during which an automatic forced regeneration is performed, the engine speed is constantly greater than or equal to the predetermined value Nth. In this way, it is possible to prevent a breakdown due to heat of the DPF 72, and prevent a degradation of a filter performance.

Further, in First Embodiment, the lower limit control of the engine speed is continued during a predetermined time (duration TB) after the point in time t2 at which an automatic forced regeneration is ended. In this way, it is controlled such that the lower limit of the engine speed is greater than or equal to the predetermined value Nth during the duration TB even after the automatic forced regeneration is ended. As a result, exhaust gas is continued to be supplied to the DPF 72, high-temperature exhaust gas is discharged to the outside, and it is possible to reliably remove heat confined in the DPF 72.

Figure 3:
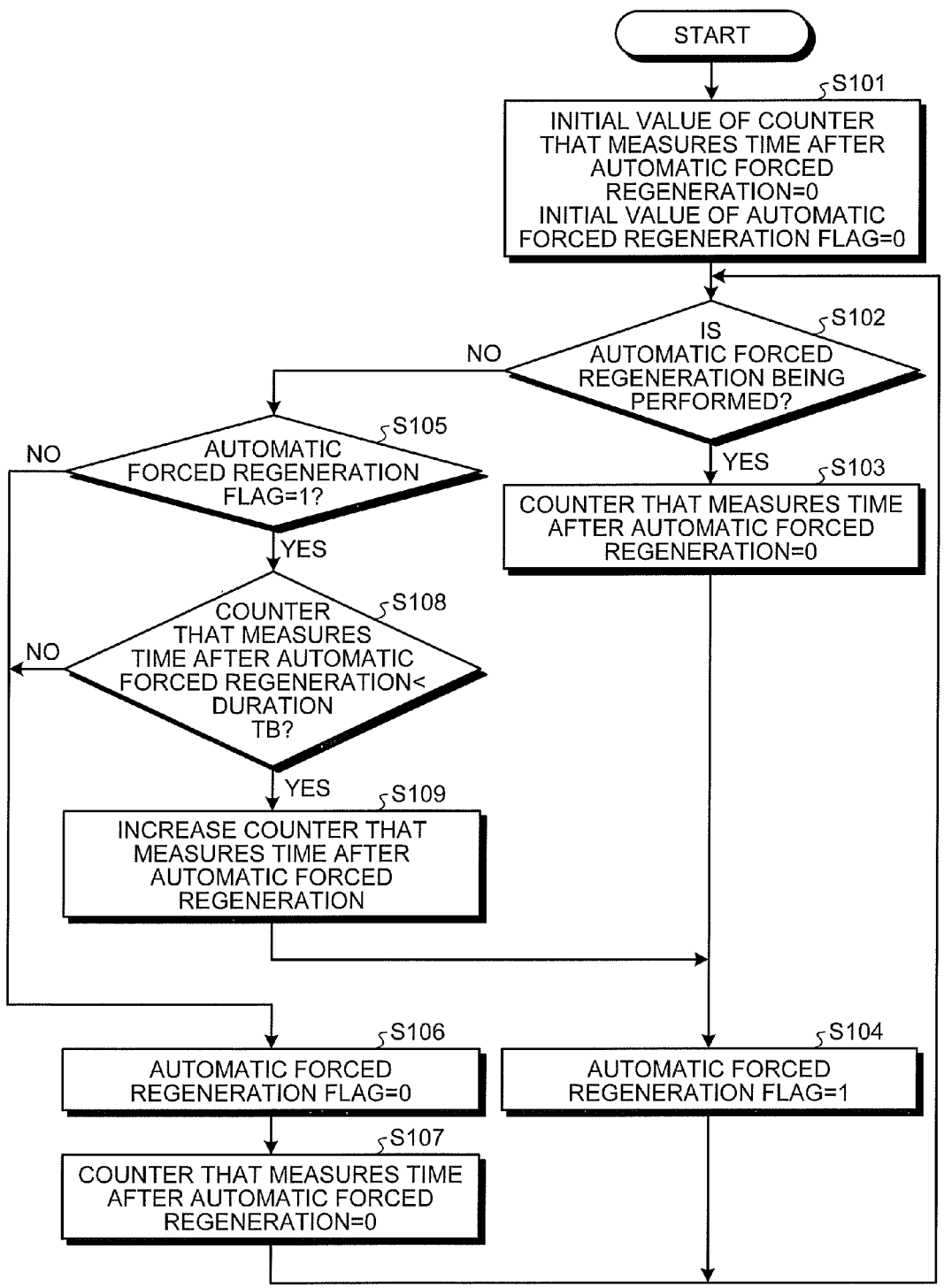
FIG. 3 is a flowchart illustrating a setting procedure of a counter and a flag used during lower limit control processing by the regeneration control unit illustrated in FIG. 1.
Figure 4:
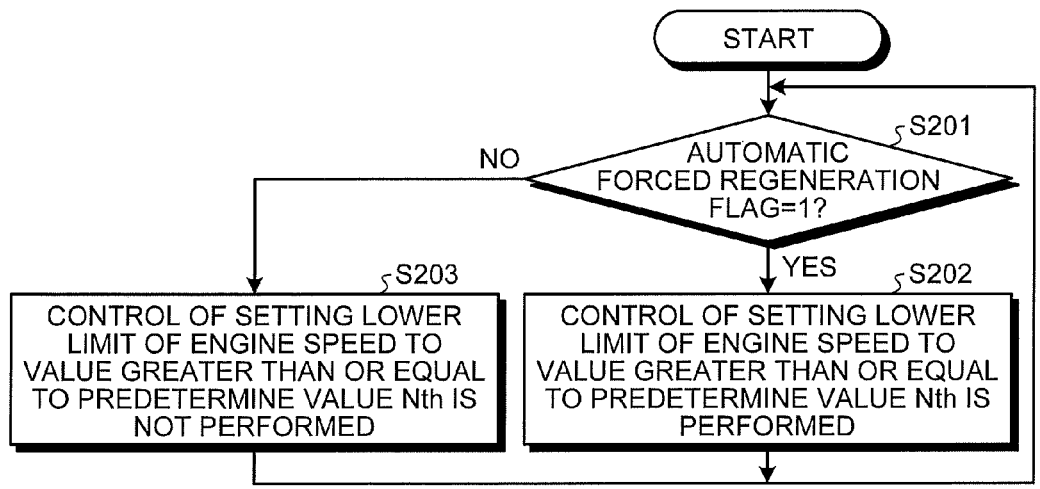
FIG. 4 is a flowchart illustrating a lower limit control procedure by the regeneration control unit illustrated in FIG. 1.

Herein, a lower limit control procedure by the regeneration control unit 42 will be described with reference to flowcharts illustrated FIG. 3 and FIG. 4. The regeneration control unit 42 performs a process of setting a value of a counter that measures time after an automatic forced regeneration which is a timer unit used to determine whether it is within the duration TB after the automatic forced regeneration is ended, and a value of an automatic forced regeneration flag which indicates that a period corresponds to one of the automatic forced regeneration period TA and the duration TB as illustrated in FIG. 3, and performs lower limit control of the engine speed using the value of the automatic forced regeneration flag as illustrated in FIG. 4. A value of the counter that measures time after an automatic forced regeneration indicates time after the automatic forced regeneration. A case in which the automatic forced regeneration flag is "1" indicates that a period corresponds to one of the automatic forced regeneration period TA and the duration TB. A case in which the automatic forced regeneration flag is "0" indicates that a period corresponds to a period other than the automatic forced regeneration period TA and the duration TB.

Referring to FIG. 3, first, as an initial setting, the regeneration control unit 42 sets an initial value of the counter that measures time after an automatic forced regeneration to "0", and sets an initial value of the automatic forced regeneration flag to "0" (step S101). Thereafter, the regeneration control unit 42 determines whether an automatic forced regeneration is currently performed (step S102). That is, it is determined whether an amount of PM accumulation exceeds the first threshold, and an automatic forced regeneration is initiated. When an automatic forced regeneration is being performed (Yes in step S102), the automatic forced regeneration is not ended, and thus a value of the counter that measures time after an automatic forced regeneration is set to "0" (step S103). Further the automatic forced regeneration flag is set to "1" (step S104), and the operation proceeds to step S102.

On the other hand, when an automatic forced regeneration is not being performed (No in step S102), it is further determined whether the automatic forced regeneration flag is set to "1" (step S105). When the automatic forced regeneration flag is not "1" (No in step S105), the automatic forced regeneration flag is set to "0" (step S106). Further, a value of the counter that measures time after an automatic forced regeneration is set to "0" (step S107), and the operation proceeds to step S102. When the automatic forced regeneration flag is "1" (Yes in step S105), the automatic forced regeneration is not currently performed, and thus it is determined whether a value of the counter that measures time after an automatic forced regeneration is less than a predetermined time (duration TB) (step S108). When a value of the counter that measures time after an automatic forced regeneration is not less than the predetermined time (duration TB) (No in step S108), the predetermined time (duration TB) is passed, and thus the automatic forced regeneration flag is set to "0" (step S106). Further, a value of the counter that measures time after an automatic forced regeneration is set to "0" (step S107), and the operation proceeds to step S102. On the other hand, when a value of the counter that measures time after an automatic forced regeneration is less than the predetermined time (duration TB) (Yes in step S108), a value of the counter that measures time after an automatic forced regeneration is increased (step S109), the automatic forced regeneration flag is continuously set to "1" (step S104), and the operation proceeds to step S102.

On the other hand, as illustrated in FIG. 4, the regeneration control unit 42 determines whether the automatic forced regeneration flag is "1" (step S201). When the automatic forced regeneration flag is "1" (Yes in step S201), the regeneration control unit 42 adjusts an amount of fuel and the like injected to the engine body 1, and performs control of setting a lower limit of the engine speed to a value greater than or equal to the predetermined value Nth (step S202). The operation proceeds to step S201. On the other hand, when the automatic forced regeneration flag is not "1" (No in step S201), the control of setting a lower limit of the engine speed to a value greater than or equal to the predetermined value Nth is not performed (step S203), and the operation proceeds to step S201. It is preferable that the predetermined time (duration TB) is set to about several minutes.

The lower limit control in step S202 may not be performed by the engine controller 30, and a throttle opening sensor 61 that detects an amount of stepping on the gas pedal 60 may receive information about an automatic forced regeneration from the engine controller 30 to perform the lower limit control. As the opening sensor 61, for example, it is possible to electrically detect an amount of stepping on the gas pedal 60 by using a potentiometer. When the opening sensor 61 performs the lower limit control, a small design change of the engine controller 30 is sufficient. In addition, similarly, regardless of a set value of the fuel management dial 80, the fuel management dial 80 may perform the lower limit control by receiving information about an automatic forced regeneration from the engine controller 30. In this case, a small design change of the engine controller 30 is sufficient. When the engine 100 is mounted on an working vehicle such as a construction machine, and the working vehicle is a crawler system (working vehicle including a traveling body provided with a crawler belt) such as a bulldozer and an excavator, the fuel management dial 80 which is a unit used when an operator sets an engine speed of the engine 100 to a predetermined engine speed is provided in an operating room. As such, the lower limit control is performed on a set value (set engine speed) of the fuel management dial 80. On the other hand, when the working vehicle is a tire system (working vehicle including a traveling body provided with a tire) such as a wheel loader and a dump truck, the gas pedal 60 is provided in an operating room, and thus the lower limit control is performed on an amount of stepping on the gas pedal 60 (engine speed corresponding to the amount of stepping).

Incidentally, an engine speed of the predetermined value Nth of the lower limit control described above is obtained by measuring a flow rate of exhaust gas and setting an engine speed (here, the engine speed is referred to as an engine speed A) capable of securing a flow rate of exhaust gas that does not damage the DPF. Herein, an idling engine speed of the engine 100 may vary depending on a type of vehicle of the working vehicle. For this reason, for example, when a set idling engine speed in a vehicle is greater than an engine speed of the predetermined value Nth of the lower limit control (for example, when an idling engine speed is 1200 rpm, and an engine speed of the predetermined value Nth of the lower limit control which is the engine speed A is 1000 rpm), the lower limit control is not needed. On the other hand, when a set idling engine speed in another vehicle is smaller than an engine speed of the predetermined value Nth of the lower limit control (for example, when an idling engine speed is 800 rpm, and an engine speed of the predetermined value Nth of the lower limit control which is the engine speed A is 1100 rpm), the lower limit control is needed.

Second Embodiment

Next, Second Embodiment will be described. In First Embodiment described above, the lower limit control is constantly performed in the automatic forced regeneration period TA. However, in Second Embodiment, the lower limit control is initiated when a control initiation condition of performing the lower limit control is satisfied within an automatic forced regeneration period TA.

Figure 5:
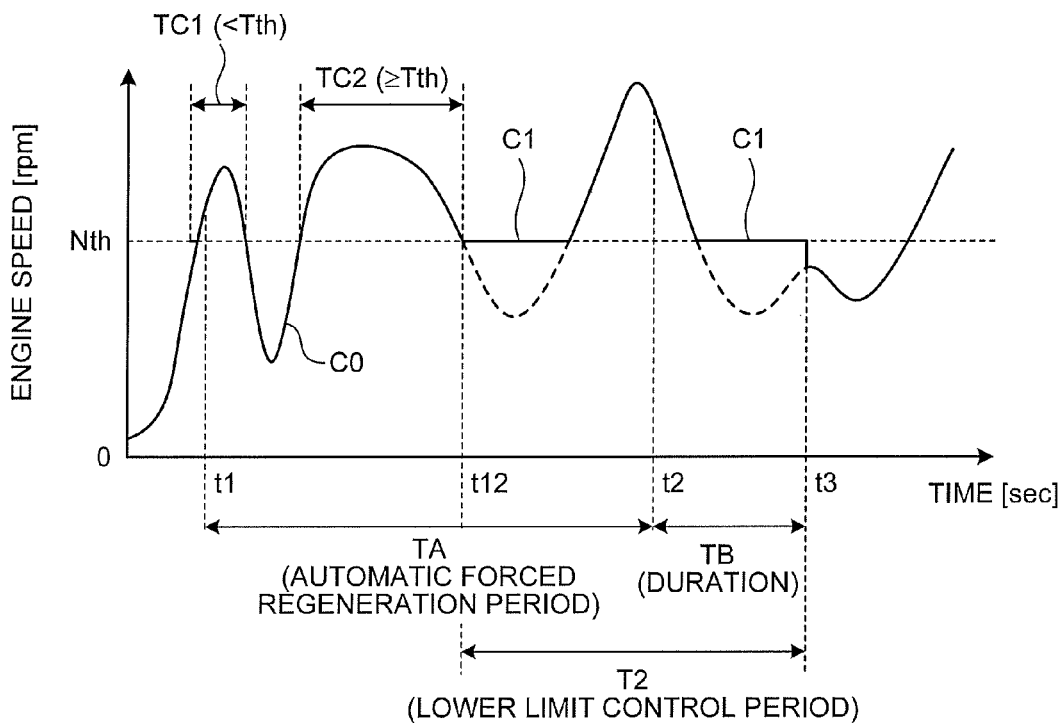
FIG. 5 is a timing chart illustrating lower limit control by a regeneration control unit according to Second Embodiment.

FIG. 5 is a timing chart illustrating lower limit control when the control initiation condition is that an engine speed is continuously greater than or equal to a predetermined value Nth and the continuation is greater than or equal to a predetermined time Tth within the automatic forced regeneration period TA. As illustrated in FIG. 5, a period TC1 during which the engine speed is greater than or equal to the predetermined value Nth lasts less than the predetermined time Tth, and thus fails to satisfy the control initiation condition. Thus, as illustrated in a portion of a solid line C0 of FIG. 5, the engine speed decreases below the predetermined value Nth. On the other hand, during a period TC2, in response to an operator operating an operating lever to operate an operating machine, the engine 100 is controlled to output power, and the engine speed increases so that the engine speed is greater than or equal to the predetermined value Nth. The period TC2 lasts for the predetermined time Tth or more, and thus satisfies the control initiation condition. As a result, the lower limit control is initiated from a point in time t12 after the predetermined time Tth. A period of the lower limit control is a lower limit control period T2 from the point in time t12 to a point in time t3 in which a duration TB is included and the control initiation condition is satisfied. In the lower limit control period T2, the engine speed varies along a solid line (including a portion of C1) of FIG. 5.

A reason for setting the control initiation condition described above will be described. An operator does not verify an automatic forced regeneration being performed. As such, when the operator is not performing any operation such as an operating lever, and an engine speed abruptly increases due to the lower limit control being performed, the increase in the engine speed causes the operator to feel a sense of operational discomfort. That is, when the lower limit control is performed, and the engine speed is not decreased as the portion of the solid line C0 of FIG. 5 and is increased to the engine speed Nth in response to an operation of the period TC1 illustrated in FIG. 5 being performed, the operator feels a sense of discomfort. Thus, in Second Embodiment, the lower limit control is performed after an operator detects an operation, for example, an operation of stepping on the gas pedal 60. That is, as described in the foregoing, when an operator performs an operation in which an engine speed greater than or equal to the predetermined value Nth lasts for the predetermined time Tth or more, the operation is an initiation condition of the lower limit control. Since the lower limit control is performed after the engine speed is increased by an apparent inclination of an operator, a sense of discomfort due to an abrupt increase in the engine speed is not felt.

Figure 6:
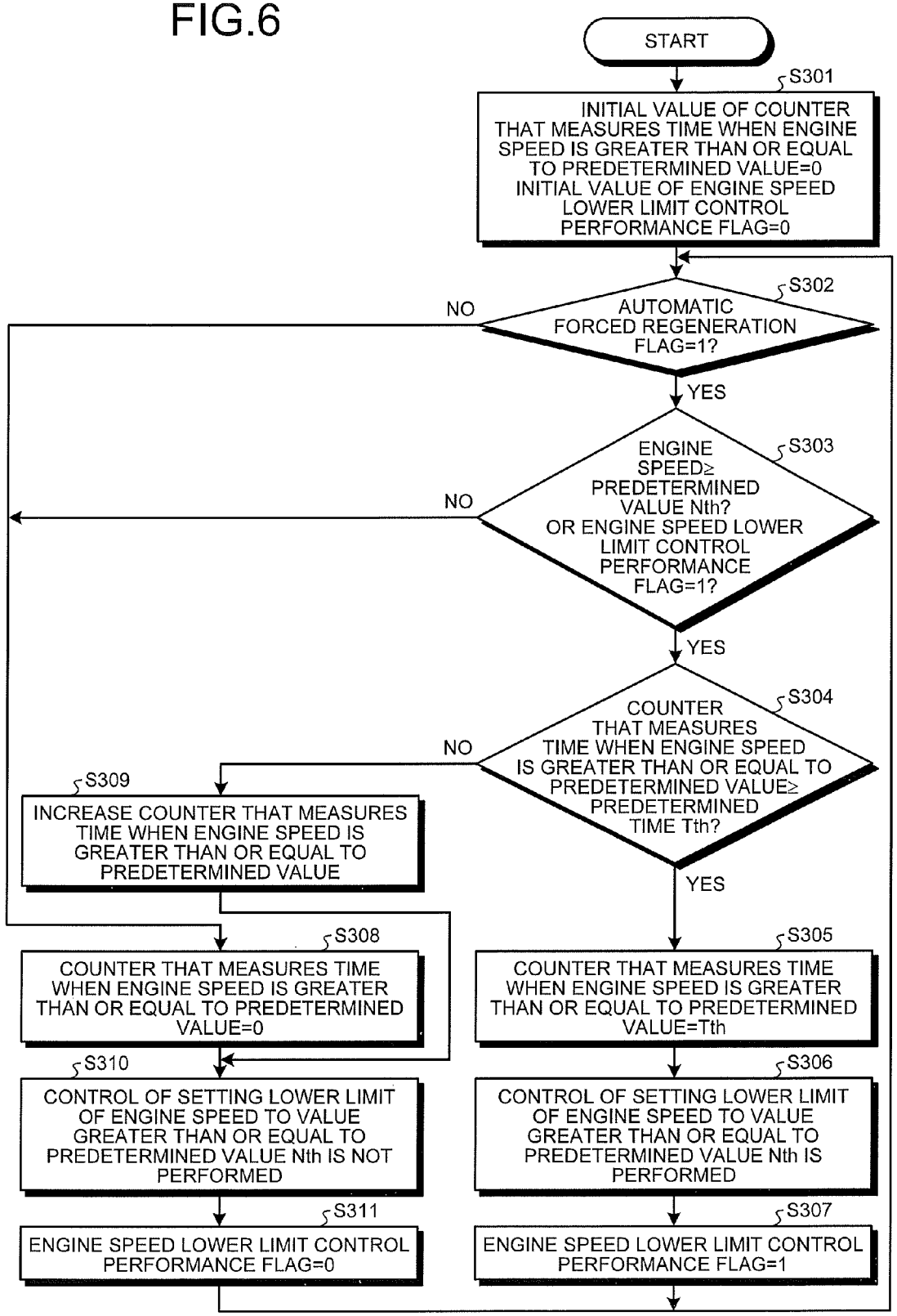
FIG. 6 is a flowchart illustrating a lower limit control procedure by the regeneration control unit according to Second Embodiment.

FIG. 6 is a flowchart illustrating a lower limit control procedure by the regeneration control unit 42 of Second Embodiment. In this case, as illustrated in FIG. 3, the regeneration control unit 42 performs a process of setting a value of a counter that measures time after an automatic forced regeneration which is a timer unit used to determine whether it is within the duration TB after the automatic forced regeneration is ended, and a value of an automatic forced regeneration flag which indicates that a period corresponds to one of the automatic forced regeneration period TA and the duration TB.

Referring to FIG. 6, first, as an initial setting, the regeneration control unit 42 sets a value of a counter that measures time when an engine speed is greater than or equal to a predetermined value to "0", and sets a value of an engine speed lower limit control performance flag to "0" (step S301). A value of the counter that measures time when an engine speed is greater than or equal to the predetermined value is a measured value of time when the engine speed is greater than or equal to the predetermined value Nth. Referring to the engine speed lower limit control performance flag, a value "1" indicates the lower limit control period T2, and a value "0" indicates a period other than the lower limit control period T2.

Thereafter, the regeneration control unit 42 determines whether an automatic forced regeneration flag is "1" (step S302). When the automatic forced regeneration flag is "1" (Yes in Step S302), it is further determined whether the engine speed is greater than or equal to the predetermined value Nth, or the engine speed lower limit control performance flag is "1" (step S303).

When the engine speed is greater than or equal to the predetermined value Nth, or the engine speed lower limit control performance flag is "1" (Yes in step S303), it is further determined whether a value of the counter that measures time when an engine speed is greater than or equal to the predetermined value is greater than or equal to the predetermined time Tth (step S304). When the value of the counter that measures time when an engine speed is greater than or equal to the predetermined value is greater than or equal to the predetermined time Tth (Yes in step S304), the value of the counter that measures time when an engine speed is greater than or equal to the predetermined value is set to Tth (step S305), and then control of setting a lower limit of the engine speed to a value greater than or equal to the predetermined value Nth is performed (step S306). Thereafter, the engine speed lower limit control performance flag is set to "1" (step S307), and then the operation proceeds to step S302.

On the other hand, when the automatic forced regeneration flag is not "1" (No in Step S302), and when the engine speed is greater than or equal to the predetermined value Nth, or the engine speed lower limit control performance flag is not "1" (No in step S303), the value of the counter that measures time when an engine speed is greater than or equal to the predetermined value is set to "0" (step S308), and the engine speed lower limit control performance flag is set to "0" (step S311) without performing control of setting a lower limit of the engine speed to a value greater than or equal to the predetermined value Nth (step S310). Thereafter, the operation proceeds to step S302. In addition, when the value of the counter that measures time when an engine speed is greater than or equal to the predetermined value is not greater than or equal to the predetermined time Tth (No in step S304), a value of the counter that measures time when an engine speed is greater than or equal to the predetermined value is increased (step S309), and the engine speed lower limit control performance flag is set to "0" (step S311) without performing control of setting a lower limit of the engine speed to a value greater than or equal to the predetermined value Nth (step S310). Thereafter, the operation proceeds to step S302.

In Second Embodiment, it is possible to prevent a breakdown due to heat of the DPF 72, and prevent a degradation of a filter performance, and it is possible to promote extension of life of the DPF 72.

Third Embodiment

Figure 7:
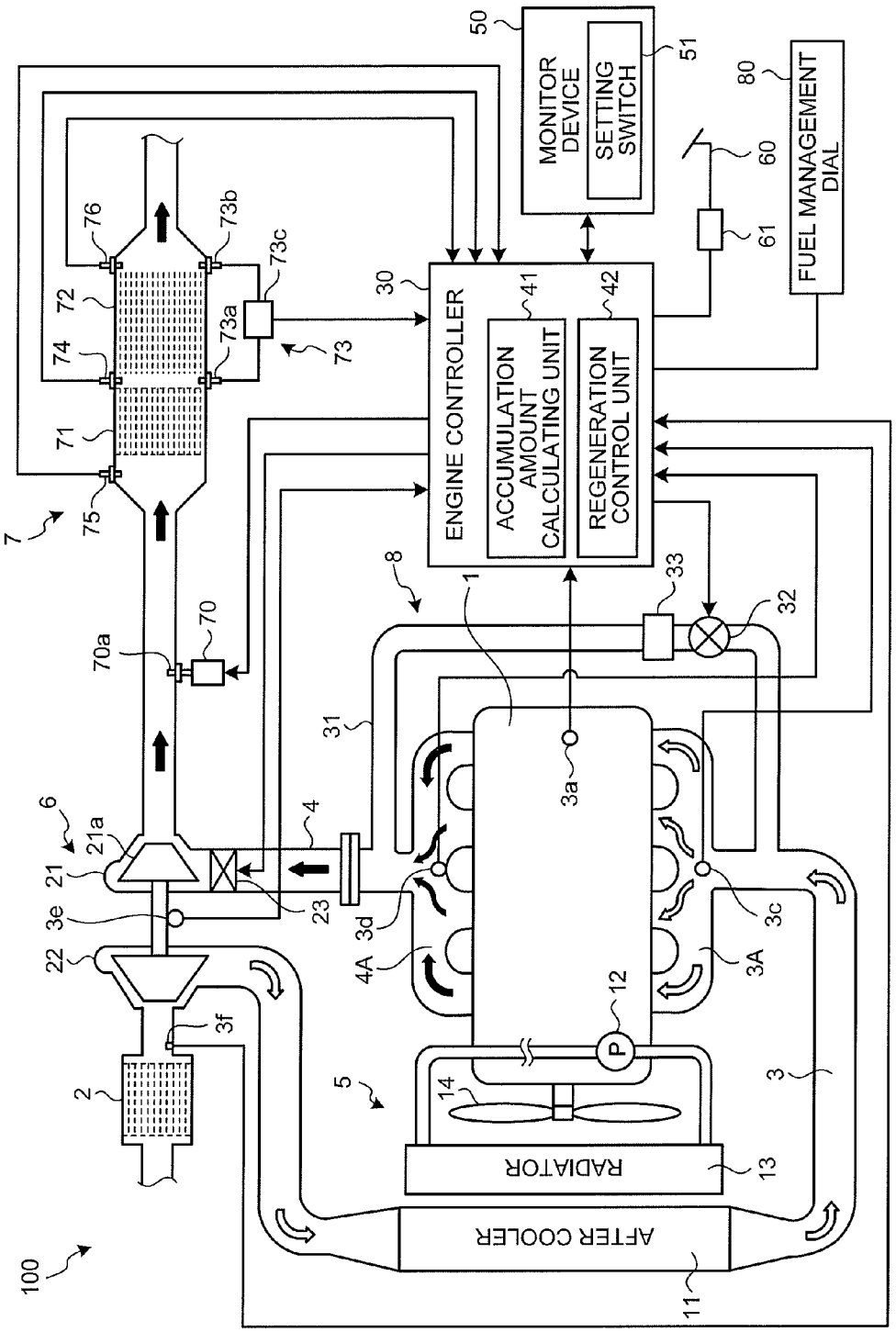
FIG. 7 is a schematic view illustrating a schematic configuration of a diesel engine 100 including a regeneration control device of a diesel particulate filter according to Third Embodiment of the invention.

Next, Third Embodiment will be described. In Third Embodiment, as illustrated in FIG. 7, the monitor device 50 further includes an operation panel where an input and output operation may be performed, and includes a setting switch 51 which is a setting unit that sets in advance whether the lower limit control described above is performed. However, the setting switch 51 of Third Embodiment may be operated when a service man, not an operator, performs a special operation on the operation panel. The special operation is an operation only known to the service man, and is, for example, an operation of pressing a plurality of buttons continuously or concurrently. Or, the setting switch 51 may be a concealed switch having a hardware configuration only known to the service man.

The service man sets in advance whether the lower limit control described above is performed on an operating machine where the engine 100 is mounted through a setting by the setting switch 51. When a setting of validity/invalidity of the lower limit control may be performed, it is possible to invalidate the lower limit control and verify an operation of an engine body during, for example, a regular inspection and the like of a working vehicle. In addition, as described in the forgoing, when a set value of an idling engine speed of the engine 100 is changed, it is possible to easily change a setting of validity or invalidity of the lower limit control.

Fourth Embodiment

Next, Fourth Embodiment will be described. In Fourth Embodiment, an operator may operate the setting switch 51. That is, since an operator may verify the lower limit control being performed by operating the setting switch 51, the operator does not feel a sense of discomfort with respect to an increase in an engine speed due to the lower limit control or no decrease in the engine speed.

Figure 8:
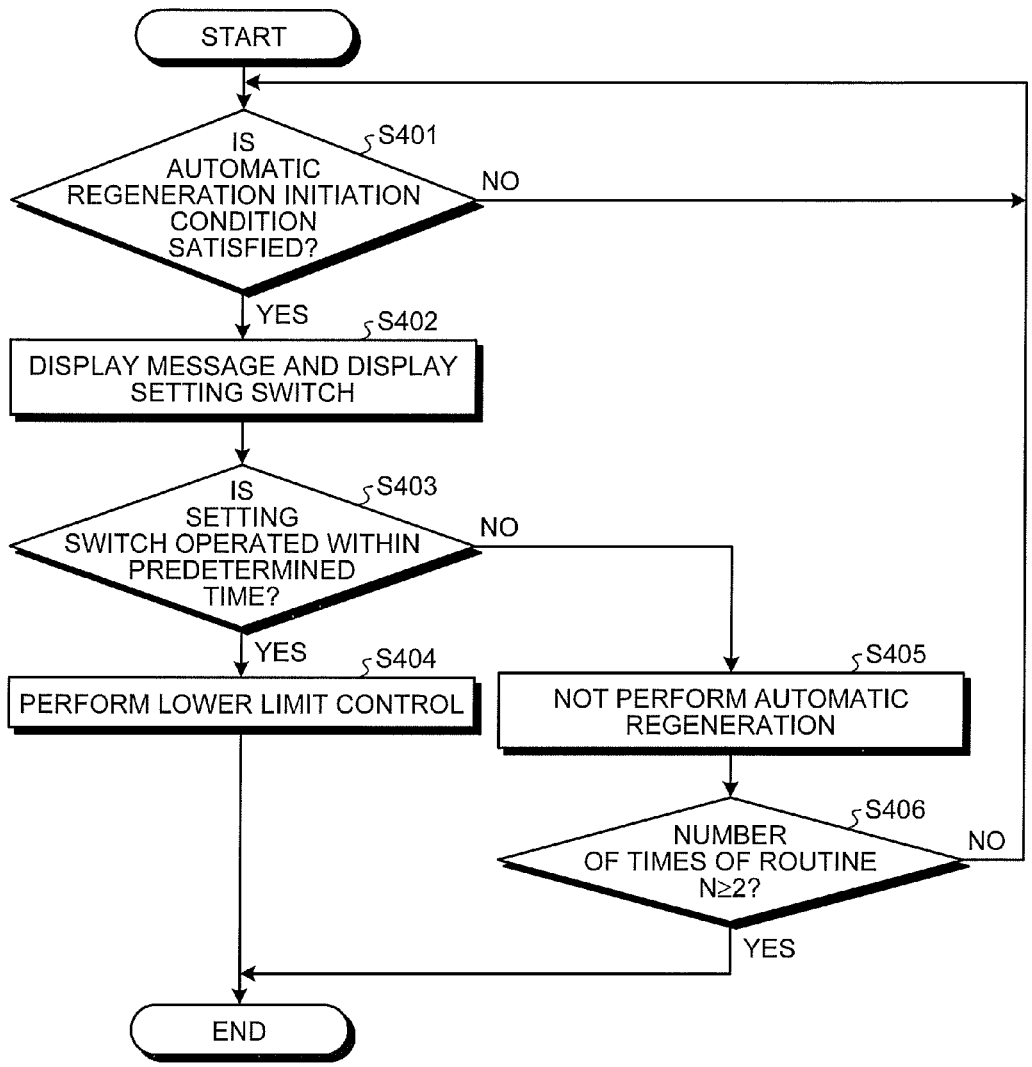
FIG. 8 is a flowchart illustrating a lower limit control procedure by a regeneration control unit according to Fourth Embodiment.

Herein, a process of proceeding to the lower limit control by the setting switch according to Fourth Embodiment will be described with reference to a flowchart illustrated in FIG. 8. First, the regeneration control unit 42 determines whether an automatic regeneration initiation condition is satisfied (step S401). The automatic regeneration initiation condition is that an amount of PM accumulation is greater than or equal to the first threshold value as described in the foregoing. When the automatic regeneration initiation condition is not satisfied (No in step S401), the determination process is repeated. On the other hand, when the automatic regeneration initiation condition is satisfied (Yes in step S401), the regeneration control unit 42 causes a message of "Start to perform lower limit control of an engine speed with an automatic regeneration?" to be displayed on a display screen of the monitor device 50, and displays the setting switch 51 operated to instruct the start of the lower limit control (step S402). Thereafter, it is determines whether the setting switch 51 is operated (start instruction) within a predetermined time (step S403).

When the setting switch 51 is operated within the predetermined time (Yes in step S403), the operation proceeds to the lower limit control (step S404), and the operation is ended. In this case, as described in First and Second Embodiments above, the lower limit control is performed by satisfying a condition of the lower limit control. On the other hand, when the setting switch 51 is not operated within the predetermined time (No in step S403), automatic regeneration control is not performed (step S405), and the operation is ended. That is, the automatic regeneration is not performed regardless of whether the automatic regeneration initiation condition is satisfied. In this case, since the automatic regeneration is not performed, an exhaust gas temperature does not rise, high-temperature exhaust gas does not stay in the DPF 72, and the DPF 72 is not damaged.

When the automatic regeneration is not performed in step S405, a number of times N at which a routine from step S405 to step S401 is performed is, for example, twice (No in step S406). Nonetheless, in a case where the operator does not perform the automatic regeneration (No in step S403, step S405, and Yes in step S406), a warning that urges a manual forced regeneration is displayed as described in the foregoing when an amount of PM accumulation is greater than or equal to the second threshold.

In First through Fourth Embodiments described above, a control parameter such as the duration TB, the predetermined time Tth, and the predetermined value Nth of an engine speed used to perform the lower limit control is a value set in advance. The working vehicle may be used at various environmental temperatures from a cold climate to an intense heat place. In addition, the working vehicle may be used at a place having a low altitude such as a coastal line construction, and may be used at a place having a high altitude such as a mine. That is, when performing the automatic forced regeneration of the DPF 72, influence of a concentration of oxygen based on an environmental temperature or an altitude may not be discounted. Thus, it is possible to perform an adequate regeneration by appropriately adjusting an amount of injection of a dozing fuel, an amount of squeezing the EGR valve 32 and the variable turbo nozzle 23, and the like in response to an environmental temperature and a concentration of oxygen. Further, when a control parameter (the duration TB, the predetermined time Tth, and the predetermined value Nth of an engine speed used to perform the lower limit control) is changed in response to an environmental temperature and a concentration of oxygen, it is possible to inhibit wasteful fuel consumption during the lower limit control.

An environmental condition detecting unit such as an outside air temperature sensor, an atmospheric pressure sensor, an altitude sensor, and a GPS sensor is amounted in the working vehicle, an environmental temperature or an altitude is detected by the environmental condition detecting unit, the detected information and a control parameter (the duration TB, the predetermined time Tth, and the predetermined value Nth of an engine speed used to perform the lower limit control) are corrected in the engine controller 30, and the corrected control parameter is used as a control parameter of the lower limit control. In addition, a relation between an environmental temperature or an altitude and a control parameter (the duration TB, the predetermined time Tth, and the predetermined value Nth of an engine speed used to perform the lower limit control) may be stored as table data in a storage device (for example, memory such as ROM and RAM) of the engine controller 30 in advance, and the lower limit control may be performed by extracting the control parameter from the table data based on an environmental temperature or an altitude detected by each sensor. By performing the lower limit control based on an environmental temperature or an altitude, it is possible to perform control of an engine speed in response to an environment, and inhibit fuel consumption. For example, at a place where an environmental temperature is low, by setting the predetermined value Nth of an engine speed to be low, and setting the duration TB to be short, it is possible to inhibit fuel consumption of the engine 100 while the lower limit control is performed.

In Second Embodiment described above, the control initiation condition is that the engine speed greater than or equal to the predetermined value Nth lasts the predetermined time Tth or more. However, the invention is not limited thereto, and the control initiation condition may be that temperatures detected by the temperature sensors 74, 75, and 76 are greater than or equal to a predetermined temperature. Further, in this case, a condition may be that a temperature gradient is greater than or equal to a predetermined value. In addition, as the control initiation condition, a flow rate of exhaust gas may be less than a predetermined value. For example, the flow rate of exhaust gas may be obtained when the engine controller 30 estimates the flow rate of exhaust gas based on a value of the flow rate sensor 3f provided at a subsequent stage of the air cleaner 2. A flow rate sensor used to measure a flow rate of exhaust gas may be provided near the DPF 72, and a flow rate of exhaust gas measured by the flow rate sensor may be directly used for determining whether the control initiation condition is satisfied.

In addition, in First through Fourth Embodiments described above, when the lower limit control described above is performed, the regeneration control unit 42 displays information about performing the lower limit control on a display screen of the monitor device 50. Or, a pilot lamp is provided, and lighting or blinking of the pilot lamp reports that the lower limit control is being performed. Or, a buzzer may be provided, and the buzzer may sound a buzzer sound indicating that the lower limit control is being performed. In any case, by providing a reporting unit which reports that the lower limit control is being performed, an operator does not feel a sense of discomfort with respect to an increase in an engine speed due to the lower limit control or no decrease in the engine speed.

In First through Fourth Embodiments described above, description has been made using the diesel engine including the exhaust gas turbine supercharger 6. However, the invention is not limited thereto, and an engine excluding the exhaust gas turbine supercharger 6 may be applied. In this case, a temperature of the DPF 72 is raised by squeezing an on-off valve of exhaust gas provided at a previous stage of the exhaust purification device 7. However, similarly to First through Fourth Embodiments described above, a flow rate of exhaust gas to the DPF 72 may be increased by performing the lower limit control of an engine speed.

REFERENCE SIGNS LIST

1 Engine body
2 Air cleaner
3 Air supply pipe line
4 Exhaust pipe line
5 Cooling mechanism
6 Exhaust gas turbine supercharger
7 Exhaust purification device
8 Exhaust gas recirculation system
3a Engine speed sensor
3c Boost pressure sensor
3d Exhaust gas pressure sensor
3e Turbine rotation speed sensor 3f Flow rate sensor
21 Turbine
21a Turbine wheel
22 Compressor
23 Variable turbo nozzle
30 Engine controller
31 Exhaust gas recirculation passage
32 EGR valve
33 EGR cooler
41 Accumulation amount calculating unit
42 Regeneration control unit
50 Monitor device
51 Setting switch
70 Dozing fuel feeder
70a Dozing nozzle
71 DOC
72 Diesel particulate filter
73 Differential pressure sensor
74 to 76 Temperature sensor
80 Fuel management dial
100 Diesel engine (engine)
TA Automatic forced regeneration period
TB Duration
T1 and T2 Lower limit control period

The invention claimed is:

1. A regeneration control device of a diesel particulate filter, comprising:
a regeneration control unit configured to combust particulate matter accumulated in a diesel particulate filter that removes the particulate matter from exhaust gas of an engine and regenerate the diesel particulate filter when an accumulation amount of the particulate matter accumulated in the diesel particulate filter exceeds a predetermined value,
wherein the regeneration control unit is configured to perform lower limit control in which a lower limit of an engine speed is set to a value greater than or equal to a predetermined threshold value during the regeneration, the regeneration control unit is configured to continue to perform the lower limit control for a predetermined time after the regeneration is ended, the regeneration control unit is configured to end the lower limit control after the predetermined time is passed and then perform an engine speed control.

2. The regeneration control device of the diesel particulate filter according to claim 1, wherein the regeneration control unit is configured to initiate the lower limit control in which the lower limit of the engine speed is set to the value greater than or equal to the predetermined threshold value when a predetermined control initiation condition is satisfied during the regeneration.

3. The regeneration control device of the diesel particulate filter according to claim 2, wherein the predetermined control initiation condition is that a state in which the engine speed is greater than or equal to the predetermined threshold value lasts a predetermined time or more.

4. The regeneration control device of the diesel particulate filter according to claim 3, further comprising:
an environmental condition detecting unit configured to detect an environmental temperature or an altitude around the engine,
wherein the predetermined threshold value and the predetermined time varies in response to the environmental temperature or the altitude detected by the environmental condition detecting unit.

5. The regeneration control device of the diesel particulate filter according to claim 2,
wherein the predetermined control initiation condition is that a temperature inside the diesel particulate filter is greater than or equal to a predetermined temperature.

6. The regeneration control device of the diesel particulate filter according to claim 2,
wherein the predetermined control initiation condition is that a flow rate of the exhaust gas is less than or equal to a predetermined flow rate.

7. The regeneration control device of the diesel particulate filter according to claim 1, further comprising:
a setting unit configured to give a setting instruction to perform the lower limit control,
wherein the regeneration control unit is configured to perform the lower limit control when the setting instruction of the lower limit control is given by the setting unit.

8. The regeneration control device of the diesel particulate filter according to claim 7, wherein the regeneration control unit is configured not to perform an automatic regeneration process of the diesel particulate filter when the setting instruction of the lower limit control is not given by the setting unit.

9. A regeneration control method of a diesel particulate filter, comprising:
combusting particulate matter accumulated in a diesel particulate filter that removes the particulate matter from exhaust gas of an engine and regenerating the diesel particulate filter when an accumulation amount of the particulate matter accumulated in the diesel particulate filter exceeds a predetermined value,
wherein the combusting and regenerating comprises performing lower limit control in which a lower limit of an engine speed is set to a value greater than or equal to a predetermined threshold value during the regeneration, comprises continuously performing the lower limit control for a predetermined time after the regeneration is ended, and comprises performing an engine speed control after the lower limit control is ended.

10. The regeneration control method of the diesel particulate filter according to claim 9, wherein the combusting and regenerating comprises initiating the lower limit control in which the lower limit of the engine speed is set to the value greater than or equal to the predetermined value when a predetermined control initiation condition is satisfied during the regeneration.

* * * * *